US010807865B2

(12) United States Patent
Chen et al.

(10) Patent No.: US 10,807,865 B2
(45) Date of Patent: Oct. 20, 2020

(54) SEMICONDUCTOR NANOCRYSTALS

(75) Inventors: Ou Chen, Somerville, MA (US);
Moungi G. Bawendi, Cambridge, MA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 912 days.

(21) Appl. No.: 13/421,527

(22) Filed: Mar. 15, 2012

(65) Prior Publication Data

US 2013/0240787 A1 Sep. 19, 2013

(51) Int. Cl.
| | |
|---|---|
| *C09K 11/56* | (2006.01) |
| *B82Y 30/00* | (2011.01) |
| *B82Y 20/00* | (2011.01) |
| *C09K 11/02* | (2006.01) |
| *C09K 11/88* | (2006.01) |

(52) U.S. Cl.
CPC ............... *B82Y 30/00* (2013.01); *B82Y 20/00* (2013.01); *C09K 11/02* (2013.01); *C09K 11/565* (2013.01); *C09K 11/881* (2013.01)

(58) Field of Classification Search
CPC .................................................. C09K 11/565
See application file for complete search history.

(56) References Cited

U.S. PATENT DOCUMENTS

| | | | | |
|---|---|---|---|---|
| 6,322,901 | B1 * | 11/2001 | Bawendi ................. | C01B 17/20 257/E33.004 |
| 7,253,452 | B2 * | 8/2007 | Steckel .................. | B82Y 20/00 257/103 |
| 7,767,260 | B2 * | 8/2010 | Peng et al. .................... | 427/214 |
| 8,481,113 | B2 * | 7/2013 | Bawendi et al. ............. | 427/212 |
| 2007/0059527 | A1 | 3/2007 | Jun et al. | |
| 2011/0129420 | A1 * | 6/2011 | Allen .................. | A61K 49/0067 424/9.1 |
| 2012/0049119 | A1 * | 3/2012 | Greytak et al. ......... | 252/301.6 S |

FOREIGN PATENT DOCUMENTS

| | | | |
|---|---|---|---|
| WO | WO2009123763 | * | 10/2009 |
| WO | WO 2012/027203 | | 3/2012 |

OTHER PUBLICATIONS

Jun. Alkyl thiols as a sulfur precursor for the preparation of monodisperse metal sulfide nanostructures.Nanotechnology 17 (2006) 4806-4810.*
Mekis, I., et al. J. Phys. Chem. B 2003, 107, 7454-7462.
Chestnoy, N, et al., 1986, J. Phys. Chem., 90, 3393.
Jang, E., et al. 2004, J. Phys. Chem. B, 108, 4597.
Joo, J., et al., 2003, J. Am. Chem. Soc., 125, 11100.
Cao, Y.C. and Wang, J. 2004, J. Am. Chem. Soc., 126, 14336.
Yu, Z. et al. 2003, J. Phys. Chem. B., 107, 5670.
Galland, C., et al. 2011, Nature, 479(7372); 203.
Carbone, L., et al. Nano Lett. 2007, 7, 2942-2950.
Chen, Y., et al. J. Am. Chem. Soc. 2008, 130, 5026-5027.
International Search Report; dated May 28, 2013; International Application No. PCT/US2013/031475.
Chen et al., "Single-source precursor route for overcoating CdS and ZnS shells around CdSe core nanocrystals,", Jun. 1, 2010, 5(2) 214-220.

* cited by examiner

*Primary Examiner* — Matthew E. Hoban
(74) *Attorney, Agent, or Firm* — Steptoe & Johnson LLP

(57) ABSTRACT

A method of making a nanocrystal includes slowly infusing a M-containing compound and a X donor into a mixture including a nanocrystal core, thereby forming an overcoating including M and X on the core.

19 Claims, 4 Drawing Sheets

SEMICONDUCTOR NANOCRYSTALS

STATEMENT REGARDING FEDERALLY SPONSORED RESEARCH OR DEVELOPMENT

This invention was made with government support under Grant No. 5R01CA126642-02, awarded by NIH. The government has certain rights in this invention.

TECHNICAL FIELD

This invention relates to highly luminescent semiconductor nanocrystals and methods of making and using them.

BACKGROUND

Semiconductor nanocrystals are a powerful class of nanostructures that exhibit high photoluminescence quantum yields, large molar extinction coefficients, high photostability compared to typical molecular fluorophores, and size-tunable emission wavelengths that can extend across the visible and near-IR spectral range. These properties make semiconductor nanocrystals useful in applications including biological fluorescent tags and light-emitting devices, among others.

Nanocrystals having small dimensions can have properties intermediate between molecular and bulk forms of matter. For example, nanocrystals of semiconductor materials having sufficiently small dimensions can exhibit quantum confinement of excitons (excited state electron-hole pair) in all three dimensions. Quantum confinement leads to an increase in the effective band gap of the material with decreasing crystallite size. Consequently, both the optical absorption and emission of nanocrystals shift to the blue (i.e., to higher energies) as the size of the nanocrystal decreases.

The quantum efficiency of emission from nanocrystals having a core of a first semiconductor material can be enhanced by applying an overcoating of a second semiconductor material such that the conduction band of the second semiconductor material is of higher energy than that of the first semiconductor material, and the valence band of the second semiconductor material is of lower energy than that of the first semiconductor material. As a result, both charge carriers of an exciton, i.e., electrons and holes, are confined in the core of the nanocrystal.

SUMMARY

Semiconductor nanocrystals have size-dependent optical and electronic properties. In particular, the band gap energy of a semiconductor nanocrystal of a particular semiconductor material varies with the diameter of the crystal. Generally, a semiconductor nanocrystal is a member of a population of nanocrystals having a distribution of sizes. When the distribution is centered about a single value and narrow, the population can be described as monodisperse. Monodisperse particles can be defined as having at least 60% of the particles fall within a specified particle size range. Monodisperse particles can have 10% or less rms deviation in diameter, preferably 5% or less.

Many applications of semiconductor nanocrystals depend on their photoluminescent properties. Accordingly, semiconductor nanocrystals having narrow emission linewidths (expressed, for example, as a full width at half max), known emission energies, and high quantum yields are desirable.

The manufacturing of colloidal semiconductor nanocrystal cores and overcoatings has been described abundantly. Overcoating of the semiconductor nanocrystal cores can be accomplished by slowly and steadily injecting overcoating precursors into a mixture with the cores. The slow injection overcoating process can result in high quality semiconductor nanocrystals with narrow size distribution, narrow photoluminescence peak width, and high photoluminescence quantum yield. In addition, the nanocrystals can have reduced single dot blinking.

In one aspect, a method of making a nanocrystal can include slowly infusing a M-containing compound and a X donor into a mixture including a nanocrystal core, thereby forming an overcoating including M and X on the core. In one embodiment, the M-containing compound can be a metal salt. The metal salt can be a cadmium salt. In another embodiment, the X donor can be an alkyl thiol. The X donor can be a $C_6$ to $C_{18}$ alkyl thiol.

In one embodiment, the infusion can occur over a period of 1 minute or longer. In another embodiment, the infusion can occur over a period of 10 minutes or longer. In another embodiment, the infusion can occur over a period of 30 minutes or longer. The infusing can occur continuously.

In one embodiment, contacting the M-containing compound and the X donor with the nanocrystal core at a slow rate of infusion can be accomplised with a syringe pump. In another embodement, the overcoated nanocrystal can photoluminesce with a quantum yield of at least 90% at room temperature. The overcoated nanocrystal can photoluminesce with a quantum yield of at least 97% at room temperature.

In another embodiment, the method can include exposing the overcoated nanocrystal to an organic compound having affinity for a surface of the overcoated nanocrystal. The nanocrystal core can include CdSe. The overcoating can include CdS. The nanocrystal core can be a member of a substantially monodisperse population of nanocrystal cores. The overcoated nanocrystal can be a member of a substantially monodisperse population of overcoated nanocrystals.

In another embodiment, the population can emit light in a spectral range of no greater than about 34 nm full width at half max (FWHM). The population can exhibit less than a 10% rms deviation in diameter of the overcoated nanocrystal. The population can exhibit less than a 5% rms deviation in diameter of the overcoated nanocrystal.

In another aspect, in a population of semiconductor nanocrystals, each member of the population can include a core including a first semiconductor material and an overcoating including a second semiconductor material on a surface of the core; where the population can have any one or more of the following properties: (a) the population has an average diameter of no greater than 10 nm and exhibits less than a 5% rms deviation in diameter; (b) the population photoluminesces with a quantum yield of at least 90% at room temperature; (c) the population emits light in a spectral range of no greater than about 25 nm full width at half max (FWHM); or (d) the population has an average blinking on-time fraction of 80% or greater.

With regard to property (b), the population can photoluminesce with a quantum yield of at least 90%, at least 95%, or at least 97% at room temperature. With regard to property (c), the population can emit light in a spectral range of no greater than about 34 nm, no greater than about 30 nm, no greater than about 25 nm, or no greater than about 20 nm full width at half max (FWHM). With regard to property (d), the population can have an average blinking on-time fraction of 80% or greater, 85% or greater, or 90% or greater. The population can have any one, two, or three of properties (a)-(d), or all four of properties (a)-(d).

Other aspects, embodiments, and features will become apparent from the following description, the drawings, and the claims.

DETAILED DESCRIPTION

Figure 1:
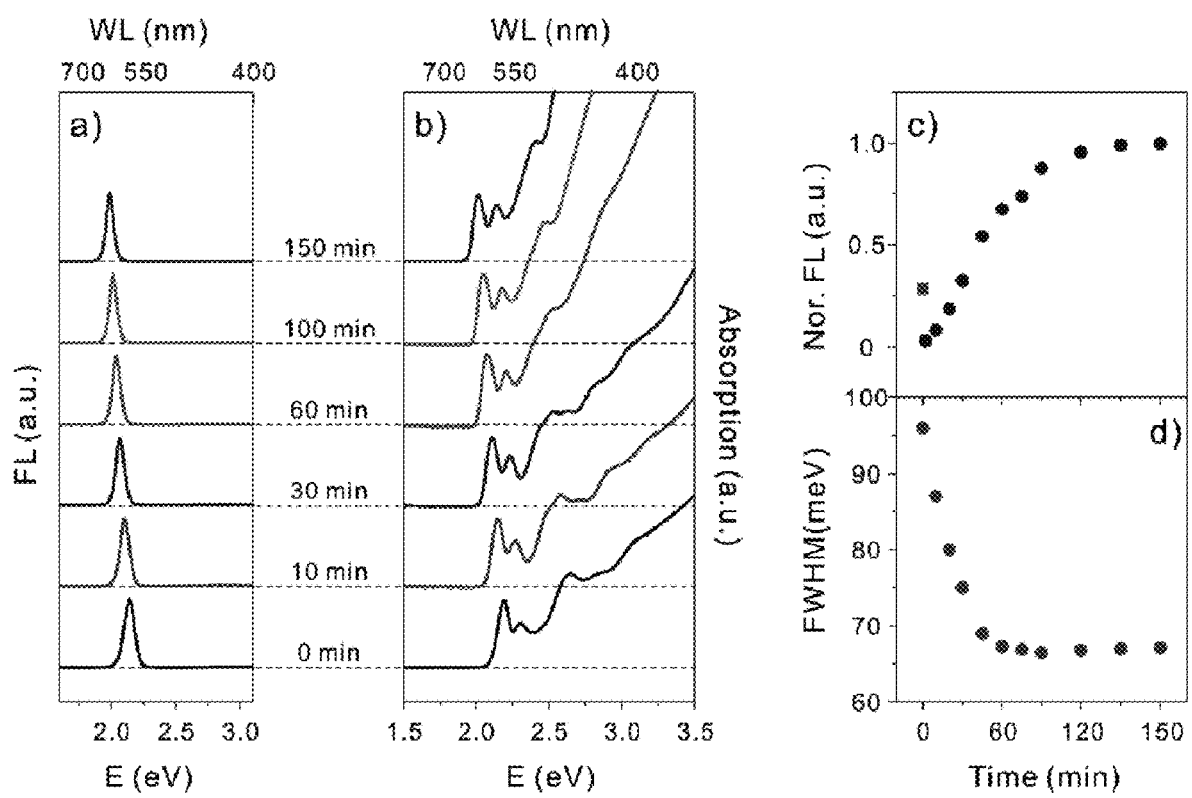
FIG. 1 shows graphs of the temporal evolution of a) the fluorescence (FL) spectrum and b) the absorption spectrum, c) the normalized FL intensity and d) full width at half maximum (FWHM) of the fluorescence spectrum during the CdSe/CdS core/shell synthesis.
Figure 2:
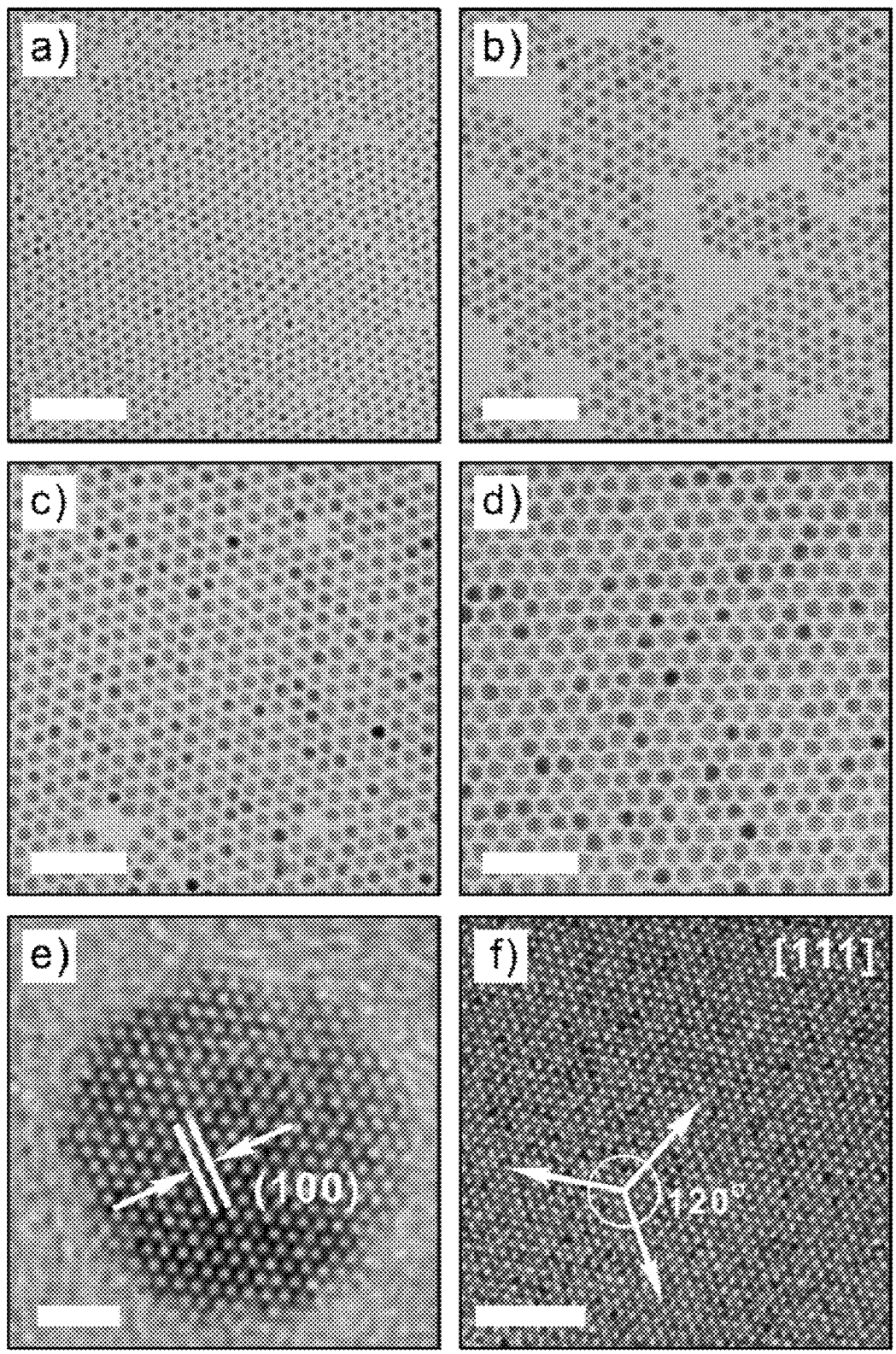
FIG. 2 shows TEM images of CdSe plain cores (a) and CdSe/CdS core/shell nanocrystals with different CdS shell thickness of 0.85 nm (b), 1.6 nm (c) and 2.35 nm (d). A high-resolution TEM image of final CdSe/CdS core/shell nanocrystals shown in (d). (f) Large area TEM image of nanocrystal superlattice formed by CdSe/CdS nanocrystals shown in (d). Scale bars are 50 nm in (a)-(d), 2 nm in (e) and 200 nm in (f).

Colloidal semiconductor nanocrystals, especially core/shell semiconductor nanocrystals, are a powerful class of light emitting agent with large extinction coefficients, good photostability and narrow emission tunable across a wide spectral window. These nanocrystals can be applied in fields ranging from biological imaging to next generation displays. See, for example, Dabbousi, B. O., et al. *J. Phys. Chem. B* 1997, 101, 9463-9475; Mekis, I., et al. *J. Phys. Chem. B* 2003, 107, 7454-7462; Jun, S., et al. *Nanotechnology* 2006, 17, 4806-4810; Li, J. J., et al. *J. Am. Chem. Soc.* 2003, 125, 12567-12575; and Xie, R., et al. *J. Am. Chem. Soc.* 2005, 127, 7480-7488, each of which is incorporated by reference in its entirety. Methods of synthesis of high-quality core/shell semiconductor nanocrystals with narrow size distribution and high photoluminescence (PL) quantum yield (QY) are in high demand.

Semiconductor nanocrystals demonstrate quantum confinement effects in their luminescence properties. When semiconductor nanocrystals are illuminated with a primary energy source, a secondary emission of energy occurs at a frequency related to the band gap of the semiconductor material used in the nanocrystal. In quantum confined particles, the frequency is also related to the size of the nanocrystal.

The semiconductor forming the nanocrystals can include a Group II-VI compound, a Group II-V compound, a Group III-VI compound, a Group III-V compound, a Group IV-VI compound, a Group I-III-VI compound, a Group II-IV-VI compound, or a Group II-IV-V compound, for example, ZnO, ZnS, ZnSe, ZnTe, CdO, CdS, CdSe, CdTe, MgO, MgS, MgSe, MgTe, HgO, HgS, HgSe, HgTe, AN, AlP, AlAs, AlSb, GaN, GaP, GaAs, GaSb, InN, InP, InAs, InSb, TlN, TlP, TlAs, TlSb, TlSb, PbS, PbSe, PbTe, $Cd_3As_2$, $Cd_3P_2$ or mixtures thereof.

In general, the method of manufacturing a nanocrystal is a colloidal growth process. See, for example, U.S. Pat. Nos. 6,322,901, 6,576,291, and 7,253,452, and U.S. patent application Ser. No. 12/862,195, filed Aug. 24, 2010, each of which is incorporated by reference in its entirety. Colloidal growth can result when an M-containing compound and an X donor are rapidly injected into a hot coordinating solvent. The coordinating solvent can include an amine. The M-containing compound can be a metal, an M-containing salt, or an M-containing organometallic compound. The injection produces a nucleus that can be grown in a controlled manner to form a nanocrystal. The reaction mixture can be gently heated to grow and anneal the nanocrystal. Both the average size and the size distribution of the nanocrystals in a sample are dependent on the growth temperature. In some circumstances, the growth temperature necessary to maintain steady growth increases with increasing average crystal size. The nanocrystal is a member of a population of nanocrystals. As a result of the discrete nucleation and controlled growth, the population of nanocrystals obtained has a narrow, monodisperse distribution of diameters. The monodisperse distribution of diameters can also be referred to as a size. The process of controlled growth and annealing of the nanocrystals in the coordinating solvent that follows nucleation can also result in uniform surface derivatization and regular core structures. As the size distribution sharpens, the temperature can be raised to maintain steady growth. By adding more M-containing compound or X donor, the growth period can be shortened. When adding more M-containing compound or X donor after the initial injection, the addition can be relatively slow, e.g., in several discrete portions added at intervals, or a slow continuous addition. Introducing can include heating a composition including the coordinating solvent and the M-containing compound, rapidly adding a first portion of the X donor to the composition, and slowly adding a second portion of the X donor. Slowly adding the second portion can include a substantially continuous slow addition of the second portion. See, for example, U.S. patent application Ser. No. 13/348,126 which was filed on Jan. 11, 2012, which is incorporated by reference in its entirety.

The M-containing salt can be a non-organometallic compound, e.g., a compound free of metal-carbon bonds. M can be cadmium, zinc, magnesium, mercury, aluminum, gallium, indium, thallium, or lead. The M-containing salt can be a metal halide, metal carboxylate, metal carbonate, metal hydroxide, metal oxide, or metal diketonate, such as a metal acetylacetonate. The M-containing salt is less expensive and safer to use than organometallic compounds, such as metal alkyls. For example, the M-containing salts are stable in air, whereas metal alkyls are generally unstable in air. M-containing salts such as 2,4-pentanedionate (i.e., acetylacetonate (acac)), halide, carboxylate, hydroxide, oxide, or carbonate salts are stable in air and allow nanocrystals to be manufactured under less rigorous conditions than corresponding metal alkyls. In some cases, the M-containing salt can be a long-chain carboxylate salt, e.g., a $C_8$ or higher (such as $C_8$ to $C_{20}$, or $C_{12}$ to $C_{18}$), straight chain or branched, saturated or unsaturated carboxylate salt. Such salts include, for example, M-containing salts of lauric acid, myristic acid, palmitic acid, stearic acid, arachidic acid, palmitoleic acid, oleic acid, linoleic acid, linolenic acid, or arachidonic acid.

Suitable M-containing salts include cadmium acetylacetonate, cadmium iodide, cadmium bromide, cadmium chloride, cadmium hydroxide, cadmium carbonate, cadmium acetate, cadmium myristate, cadmium oleate, cadmium oxide, zinc acetylacetonate, zinc iodide, zinc bromide, zinc chloride, zinc hydroxide, zinc carbonate, zinc acetate, zinc myristate, zinc oleate, zinc oxide, magnesium acetylacetonate, magnesium iodide, magnesium bromide, magnesium chloride, magnesium hydroxide, magnesium carbonate, magnesium acetate, magnesium myristate, magnesium oleate, magnesium oxide, mercury acetylacetonate, mercury iodide, mercury bromide, mercury chloride, mercury hydroxide, mercury carbonate, mercury acetate, mercury myristate, mercury oleate, aluminum acetylacetonate, aluminum iodide, aluminum bromide, aluminum chloride, aluminum hydroxide, aluminum carbonate, aluminum acetate, aluminum myristate, aluminum oleate, gallium acetylacetonate, gallium iodide, gallium bromide, gallium chloride, gallium hydroxide, gallium carbonate, gallium acetate, gallium myristate, gallium oleate, indium acetylacetonate, indium iodide, indium bromide, indium chloride, indium hydroxide, indium carbonate, indium acetate, indium myristate, indium oleate, thallium acetylacetonate, thallium iodide, thallium bromide, thallium chloride, thallium hydroxide, thallium carbonate, thallium acetate, thallium myristate, or thallium oleate.

Prior to combining the M-containing salt with the X donor, the M-containing salt can be contacted with a coordinating solvent to form an M-containing precursor. Typical coordinating solvents include alkyl phosphines, alkyl phosphine oxides, alkyl phosphonic acids, or alkyl phosphinic acids; however, other coordinating solvents, such as pyridines, furans, and amines may also be suitable for the nanocrystal production. Examples of suitable coordinating solvents include pyridine, tri-n-octyl phosphine (TOP) and tri-n-octyl phosphine oxide (TOPO). Technical grade TOPO can be used. The coordinating solvent can include a 1,2-diol or an aldehyde. The 1,2-diol or aldehyde can facilitate reaction between the M-containing salt and the X donor and improve the growth process and the quality of the nanocrystal obtained in the process. The 1,2-diol or aldehyde can be a $C_6$-$C_{20}$ 1,2-diol or a $C_6$-$C_{20}$ aldehyde. A suitable 1,2-diol is 1,2-hexadecanediol or myristol and a suitable aldehyde is dodecanal is myristic aldehyde.

The X donor is a compound capable of reacting with the M-containing salt to form a material with the general formula MX. Typically, the X donor is a chalcogenide donor or a pnictide donor, such as a phosphine chalcogenide, a bis(silyl) chalcogenide, dioxygen, an ammonium salt, or a tris(silyl) pnictide. Suitable X donors include dioxygen, elemental sulfur, bis(trimethylsilyl) selenide ($(TMS)_2Se$), trialkyl phosphine selenides such as (tri-n-octylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl)telluride ($(TMS)_2Te$), sulfur, bis(trimethylsilyl)sulfide ($(TMS)_2S$), a trialkyl phosphine sulfide such as (tri-n-octylphosphine) sulfide (TOPS), tris(dimethylamino) arsine, an ammonium salt such as an ammonium halide (e.g., $NH_4Cl$), tris(trimethylsilyl) phosphide ($(TMS)_3P$), tris(trimethylsilyl) arsenide ($(TMS)_3As$), or tris(trimethylsilyl) antimonide ($(TMS)_3Sb$). In certain embodiments, the M donor and the X donor can be moieties within the same molecule.

The X donor can be a compound of formula (I):

$$X(Y(R)_3)_3 \tag{I}$$

where X is a group V element, Y is a group IV element, and each R, independently, is alkyl, alkenyl, alkynyl, cycloalkyl, cycloalkenyl, heterocyclyl, aryl, or heteroaryl, where each R, independently, is optionally substituted by 1 to 6 substituents independently selected from hydrogen, halo, hydroxy, nitro, cyano, amino, alkyl, cycloalkyl, cycloalkenyl, alkoxy, acyl, thio, thioalkyl, alkenyl, alkynyl, cycloalkenyl, heterocyclyl, aryl, or heteroaryl. See, e.g., provisional U.S. Patent Application No. 61/535,597, filed Sep. 16, 2011, which is incorporated by reference in its entirety.

In some embodiments, X can be N, P, As, or Sb. Y can be C, Si, Ge, Sn, or Pb. Each R, independently, can be alkyl or cycloalkyl. In some cases, each R, independently, can be unsubstituted alkyl or unsubstituted cycloalkyl, for example, a $C_1$ to $C_8$ unsubstituted alkyl or a $C_3$ to $C_8$ unsubstituted cycloalkyl. In some embodiments, X can be P, As, or Sb. In some embodiments, Y can be Ge, Sn, or Pb.

In some embodiments, X can be P, As, or Sb, Y can be Ge, Sn, or Pb, and each R, independently, can be unsubstituted alkyl or unsubstituted cycloalkyl, for example, a $C_1$ to $C_8$ unsubstituted alkyl or a $C_3$ to $C_8$ unsubstituted cycloalkyl. Each R, independently, can be unsubstituted alkyl, for example, a $C_1$ to $C_6$ unsubstituted alkyl.

Alkyl is a branched or unbranched saturated hydrocarbon group of 1 to 30 carbon atoms, such as methyl, ethyl, n-propyl, isopropyl, n-butyl, isobutyl, t-butyl, octyl, decyl, tetradecyl, hexadecyl, eicosyl, tetracosyl and the like. Optionally, an alkyl group can be substituted by 1 to 6 substituents independently selected from hydrogen, halo, hydroxy, nitro, cyano, amino, alkyl, cycloalkyl, cycloalkenyl, alkoxy, acyl, thio, thioalkyl, alkenyl, alkynyl, cycloalkenyl, heterocyclyl, aryl, or heteroaryl. Optionally, an alkyl group can contain 1 to 6 linkages selected from —O—, —S—, -M- and —NR— where R is hydrogen, or $C_1$-$C_8$ alkyl or lower alkenyl. Cycloalkyl is a cyclic saturated hydrocarbon group of 3 to 10 carbon atoms, such as cyclopropyl, cyclobutyl, cyclopentyl, cyclohexyl, cycloheptyl, cyclooctyl, and the like. A cycloalkyl group can be optionally substituted, or contain linkages, as an alkyl group does.

Alkenyl is a branched or unbranched unsaturated hydrocarbon group of 2 to 20 carbon atoms containing at least one double bond, such as vinyl, propenyl, butenyl, and the like. Cycloalkenyl is a cyclic unsaturated hydrocarbon group of 3 to 10 carbon atoms including at least one double bond. An alkenyl or cycloalkenyl group can be optionally substituted, or contain linkages, as an alkyl group does.

Alkynyl is a branched or unbranched unsaturated hydrocarbon group of 2 to 20 carbon atoms containing at least one triple bond, such as ethynyl, propynyl, butynyl, and the like. An alkynyl group can be optionally substituted, or contain linkages, as an alkyl group does.

Heterocyclyl is a 3- to 10-membered saturated or unsaturated cyclic group including at least one ring heteroatom selected from O, N, or S. A heterocylyl group can be optionally substituted, or contain linkages, as an alkyl group does.

Aryl is a 6- to 14-membered carbocyclic aromatic group which may have one or more rings which may be fused or unfused. In some cases, an aryl group can include an aromatic ring fused to a non-aromatic ring. Exemplary aryl groups include phenyl, naphthyl, or anthracenyl. Heteroaryl is a 6- to 14-membered aromatic group which may have one or more rings which may be fused or unfused. In some cases, a heteroaryl group can include an aromatic ring fused to a non-aromatic ring. An aryl or heteroaryl group can be optionally substituted, or contain linkages, as an alkyl group does.

Examples of X donors of formula (I) include: tris(trimethylgermyl)nitride, $N(Ge(CH_3)_3)_3$; tris(trimethylstannyl) nitride, $N(Sn(CH_3)_3)_3$; tris(trimethylplumbyl)nitride, $N(Pb(CH_3)_3)_3$; tris(trimethylgermyl)phosphide, $P(Ge(CH_3)_3)_3$; tris(trimethylstannyl) phosphide, $P(Sn(CH_3)_3)_3$; tris(trimethylplumbyl) phosphide, P(Pb(CH$_3$)$_3$)$_3$; tris(trimethylgermyl)arsine, As(Ge(CH$_3$)$_3$)$_3$; tris(trimethylstannyl)arsine, As(Sn(CH$_3$)$_3$)$_3$; tris(trimethylplumbyl)arsine, As(Pb(CH$_3$)$_3$)$_3$; tris(trimethylgermyl)stibine, Sb(Ge(CH$_3$)$_3$)$_3$; tris(trimethylstannyl)stibine, Sb(Sn(CH$_3$)$_3$)$_3$; and tris(trimethylplumbyl)stibine, Sb(Pb(CH$_3$)$_3$)$_3$.

For given values of X and R, varying Y can produce X donors having varying reactivity, e.g., different reaction kinetics in the formation of semiconductor nanocrystals. Thus, the reactivity of tris(trimethylsilyl)arsine in the formation of nanocrystals can be different from the reactivity of tris(trimethylstannyl)arsine or tris(trimethylplumbyl)arsine in an otherwise similar reaction. Likewise, for given values of X and Y, variations in R can produce variations in reactivity. In the formation of nanocrystals, reactivity (and particularly reaction kinetics) can affect the size and size distribution of the resulting population of nanocrystals. Thus, selection of precursors having appropriate reactivity can aid in forming a population of nanocrystals having desirable properties, such as a particular desired size and/or a narrow size distribution.

One of the methods for synthesis of semiconductor nanocrystals is injecting a metal and an X donor into a solvent. The X donor can by any listed above such as a chalcogenide donor, a pnictide donor, dioxygen or elemental sulfur. For example, injecting a metal and an S precursor separately into a hot organic solvent in the presence of surfactants. In this method (alkylsilyl) sulfur or elemental sulfur powder dissolved in a carrier solvent have been used as the S precursor. See, for example, Chestnoy, N, et al., 1986, *J. Phys. Chem.*, 90, 3393; Murray, C. B., 1993 *J. Am. Chem. Soc.*, 115, 8706; Yu, W. W. and Peng, X., 2002 *Angew. Chem. Int. Edn.*, 41, 2368; Peng, Z. A. and Peng, X., 2001, *J. Am. Chem. Soc.*, 123, 183; Jang, E., et al. 2004, *J. Phys. Chem. B*, 108, 4597; Joo, J., et al., 2003, *J. Am. Chem. Soc.*, 125, 11100; Cao, Y. C. and Wang, J. 2004, *J. Am. Chem. Soc.*, 126, 14336; and Yu, Z. et al. 2003, *J. Phys. Chem. B.*, 107, 5670, each of which is incorporated by reference in its entirety. The (alkylsilyl) sulfur is a highly reactive precursor because of the easily cleavable S—Si bond. However, the reaction can have certain drawbacks like increased reactivity and sensitivity to air. The sulfur powder dissolved in organic solvents, such as trioctylphosphine (TOP) and oleylamine (OAm), could make a more stable S—P coordinating complex or S-coordinating complex than (alkylsilyl) sulfur. However, TOP and OAm are very sensitive to oxygen so that the synthetic process might not be reliable depending on exposure to air as well as the purity of the compounds. A non-coordinating solvent such as octadecene could be a more stable carrier solvent for sulfur, but sulfur has quite limited solubility. See, for example, Jun, S., et al. 2006, *Nanotechnology*, 17: 4806-4810, which is incorporated by reference in its entirety.

Metal sulfide nanocrystals such as CdS, ZnS and PbS and metal sulfide-coated nanocrystals such as CdSe/CdS and CdTe/CdS can be synthesized by using an alkyl thiol as the sulfur precursor. Alkyl thiols can be desirable for semiconductor nanocrystal synthesis because they are miscible with most organic solvents and stable in air. CdS nanocrystals can be made from CdO and thiols with different alkyl chains such as n-octanethiol and octadecanethiol. The semiconductor nanocrystals can exhibit uniform size, highly crystalline structure and a sharp photoluminescence spectrum. Also, CdSe/CdS core-shell nanocrystals can be prepared by single injection of a mixture consisting of alkyl thiol and Se in trioctylphosphine to a Cd precursor. Alkyl thiols can react with the metal precursor to form stable metal thiolate intermediates during the initial period of reaction, and the thiolate decomposes slowly to form homogeneous nuclei. See, for example, Jun, S., et al. 2006, Nanotechnology, 17, 4806, which has been incorporated by reference in its entirety.

A coordinating solvent can help control the growth of the nanocrystal. The coordinating solvent is a compound having a donor lone pair that, for example, has a lone electron pair available to coordinate to a surface of the growing nanocrystal. Solvent coordination can stabilize the growing nanocrystal. Typical coordinating solvents include alkyl phosphines, alkyl phosphine oxides, alkyl phosphonic acids, or alkyl phosphinic acids, however, other coordinating solvents, such as pyridines, furans, and amines may also be suitable for the nanocrystal production. Examples of suitable coordinating solvents include pyridine, tri-n-octyl phosphine (TOP), tri-n-octyl phosphine oxide (TOPO) and tris-hydroxylpropylphosphine (tHPP). Technical grade TOPO can be used.

The nanocrystal manufactured from an M-containing salt can grow in a controlled manner when the coordinating solvent includes an amine. The amine in the coordinating solvent can contribute to the quality of the nanocrystal obtained from the M-containing salt and X donor. The coordinating solvent can a mixture of the amine and an alkyl phosphine oxide. The combined solvent can decrease size dispersion and can improve photoluminescence quantum yield of the nanocrystal. The amine can be a primary alkyl amine or a primary alkenyl amine, such as a $C_2$-$C_{20}$ alkyl amine, a $C_2$-$C_{20}$ alkenyl amine, preferably a $C_8$-$C_{18}$ alkyl amine or a $C_8$-$C_{18}$ alkenyl amine. For example, suitable amines for combining with tri-octylphosphine oxide (TOPO) include 1-hexadecylamine, or oleylamine. When the 1,2-diol or aldehyde and the amine are used in combination with the M-containing salt to form a population of nanocrystals, the photoluminescence quantum efficiency and the distribution of nanocrystal sizes are improved in comparison to nanocrystals manufactured without the 1,2-diol or aldehyde or the amine.

The nanocrystal can be a member of a population of nanocrystals having a narrow size distribution. The nanocrystal can be a sphere, rod, disk, or other shape. The nanocrystal can include a core of a semiconductor material. The nanocrystal can include a core having the formula MX (e.g., for a II-VI semiconductor material) or $M_3X_2$ (e.g., for a II-V semiconductor material), where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof.

The emission from the nanocrystal can be a narrow Gaussian emission band that can be tuned through the complete wavelength range of the ultraviolet, visible, or infrared regions of the spectrum by varying the size of the nanocrystal, the composition of the nanocrystal, or both. For example, both CdSe and CdS can be tuned in the visible region and InAs can be tuned in the infrared region. $Cd_3As_2$ can be tuned from the visible through the infrared.

A population of nanocrystals can have a narrow size distribution. The population can be monodisperse and can exhibit less than a 15% rms deviation in diameter of the nanocrystals, preferably less than 10%, more preferably less than 5%. Spectral emissions in a narrow range of between 10 and 100 nm full width at half max (FWHM) can be observed. Semiconductor nanocrystals can have emission quantum efficiencies (i.e., quantum yields, QY) of greater than 2%, 5%, 10%, 20%, 40%, 60%, 70%, 80%, or 90%. In some cases, semiconductor nanocrystals can have a QY of at least 90%, at least 91%, at least 92%, at least 93%, at least 94%, at least 95%, at least 96%, at least 97%, at least 97%, at least 98%, or at least 99%.

Size distribution during the growth stage of the reaction can be estimated by monitoring the absorption line widths of the particles. Modification of the reaction temperature in response to changes in the absorption spectrum of the particles allows the maintenance of a sharp particle size distribution during growth. Reactants can be added to the nucleation solution during crystal growth to grow larger crystals. By stopping growth at a particular nanocrystal average diameter and choosing the proper composition of the semiconducting material, the emission spectra of the nanocrystals can be tuned continuously over the wavelength range of 300 nm to 5 microns, or from 400 nm to 800 nm for CdSe and CdTe. The nanocrystal has a diameter of less than 150 Å. A population of nanocrystals has average diameters in the range of 15 Å to 125 Å.

The nanocrystal can be a member of a population of nanocrystals having a narrow size distribution. The nanocrystal can be a sphere, rod, disk, or other shape. The nanocrystal can include a core of a semiconductor material. The nanocrystal can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof.

The core can have an overcoating on a surface of the core. The overcoating can be a semiconductor material having a composition different from the composition of the core. The overcoat of a semiconductor material on a surface of the nanocrystal can include a Group II-VI compound, a Group II-V compound, a Group III-VI compound, a Group III-V compound, a Group IV-VI compound, a Group I-III-VI compound, a Group II-IV-VI compound, and a Group II-IV-V compound, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, $Cd_3As_2$, $Cd_3P_2$ or mixtures thereof. For example, ZnS, ZnSe or CdS overcoatings can be grown on CdSe or CdTe nanocrystals. An overcoating process is described, for example, in U.S. Pat. No. 6,322,901. By adjusting the temperature of the reaction mixture during overcoating and monitoring the absorption spectrum of the core, over coated materials having high emission quantum efficiencies and narrow size distributions can be obtained. The overcoating can be between 1 and 10 monolayers thick.

Shells are formed on nanocrystals by introducing shell precursors at a temperature where material adds to the surface of existing nanocrystals but at which nucleation of new particles is rejected. In order to help suppress nucleation and anisotropic elaboration of the nanocrystals, selective ionic layer adhesion and reaction (SILAR) growth techniques can be applied. See, e.g., U.S. Pat. No. 7,767,260, which is incorporated by reference in its entirety. In the SILAR approach, metal and chalcogenide precursors are added separately, in an alternating fashion, in doses calculated to saturate the available binding sites on the nanocrystal surfaces, thus adding one-half monolayer with each dose. The goals of such an approach are to: (1) saturate available surface binding sites in each half-cycle in order to enforce isotropic shell growth; and (2) avoid the simultaneous presence of both precursors in solution so as to minimize the rate of homogenous nucleation of new nanoparticles of the shell material.

In the SILAR approach, it can be beneficial to select reagents that react cleanly and to completion at each step. In other words, the reagents selected should produce few or no reaction by-products, and substantially all of the reagent added should react to add shell material to the nanocrystals. Completion of the reaction can be favored by adding substoichiometric amounts of the reagent. In other words, when less than one equivalent of the reagent is added, the likelihood of any unreacted starting material remaining is decreased.

The quality of core-shell nanocrystals produced (e.g., in terms of size monodispersity and QY) can be enhanced by using a constant and lower shell growth temperature. Alternatively, high temperatures may also be used. In addition, a low-temperature or room temperature "hold" step can be used during the synthesis or purification of core materials prior to shell growth.

Another approach to forming a shell on a nanocrystal core includes dissolving the cores in a coordinating solvent and then heating the mixture to between 200° C. and 350° C. At that point, a calculated amount of an M-containing compound and X donor can be slowly infused into the growth solution containing the dissolved nanocrystal cores. The slow infusion process includes adding the M-containing compound and the X donor at a rate of between 0.03 mL/min and 0.07 mL/min by using a syringe pump or any method that would allow for controlled, slow and steady addition. The final core-shell nanocrystals can be subjected to higher temperatures for further annealing, if desired. After the slow infusion, additional ligands may be added to the mixture. The shell overcoating via slow infusion can result in high quality core-shell nanocrystals with a narrow size distribution, narrow photoluminescence peak width, high photoluminescence quantum yield, and reduced single dot blinking as compared to semiconductor nanocrystals prepared by other methods.

The outer surface of the nanocrystal can include a layer of compounds derived from the coordinating agent used during the growth process. The surface can be modified by repeated exposure to an excess of a competing coordinating group to form an overlayer. For example, a dispersion of the capped nanocrystal can be treated with a coordinating organic compound, such as pyridine, to produce crystals which disperse readily in pyridine, methanol, and aromatics but no longer disperse in aliphatic solvents. Such a surface exchange process can be carried out with any compound capable of coordinating to or bonding with the outer surface of the nanocrystal, including, for example, phosphines, thiols, amines and phosphates. The nanocrystal can be exposed to short chain polymers which exhibit an affinity for the surface and which terminate in a moiety having an affinity for a suspension or dispersion medium. Such affinity improves the stability of the suspension and discourages flocculation of the nanocrystal. Nanocrystal coordinating compounds are described, for example, in U.S. Pat. No. 6,251,303, which is incorporated by reference in its entirety.

Monodentate alkyl phosphines (and phosphine oxides; the term phosphine below will refer to both) can passivate nanocrystals efficiently. When nanocrystals with conventional monodentate ligands are diluted or embedded in a non-passivating environment (i.e., one where no excess ligands are present), they tend to lose their high luminescence. Typical are an abrupt decay of luminescence, aggregation, and/or phase separation. In order to overcome these limitations, polydentate ligands can be used, such as a family of polydentate oligomerized phosphine ligands. The polydentate ligands show a high affinity between ligand and nanocrystal surface. In other words, they are stronger ligands, as is expected from the chelate effect of their polydentate characteristics.

In general, a ligand for a nanocrystal can include a first monomer unit including a first moiety having affinity for a surface of the nanocrystal, a second monomer unit including a second moiety having a high water solubility, and a third monomer unit including a third moiety having a selectively reactive functional group or a selectively binding functional group. In this context, a "monomer unit" is a portion of a polymer derived from a single molecule of a monomer. For example, a monomer unit of poly(ethylene) is —$CH_2CH_2$—, and a monomer unit of poly(propylene) is —$CH_2CH$ ($CH_3$)—. A "monomer" refers to the compound itself, prior to polymerization, e.g., ethylene is a monomer of poly (ethylene) and propylene of poly(propylene).

A selectively reactive functional group is one that can form a covalent bond with a selected reagent under selected conditions. One example of a selectively reactive functional group is a primary amine, which can react with, for example, a succinimidyl ester in water to form an amide bond. A selectively binding functional group is a functional group that can form a noncovalent complex with a selective binding counterpart. Some well-known examples of selectively binding functional groups and their counterparts include biotin and streptavidin; a nucleic acid and a sequence-complementary nucleic acid; FK506 and FKBP; or an antibody and its corresponding antigen. See, for example, U.S. Pat. Nos. 7,160,613 and 7,601,424, each of which is incorporated by reference in its entirety.

A moiety having high water solubility typically includes one or more ionized, ionizable, or hydrogen bonding groups, such as, for example, an amine, an alcohol, a carboxylic acid, an amide, an alkyl ether, a thiol, or other groups known in the art. Moieties that do not have high water solubility include, for example, hydrocarbyl groups such as alkyl groups or aryl groups, haloalkyl groups, and the like. High water solubility can be achieved by using multiple instances of a slightly soluble group: for example, diethyl ether is not highly water soluble, but a poly(ethylene glycol) having multiple instances of a —$CH_2$—O—$CH_2$— alkyl ether group can be highly water soluble.

For example, the ligand can include a polymer including a random copolymer. The random copolymer can be made using any method of polymerization, including cationic, anion, radical, metathesis or condensation polymerization, for example, living cationic polymerization, living anionic polymerization, ring opening metathesis polymerization, group transfer polymerization, free radical living polymerization, living Ziegler-Natta polymerization, or reversible addition fragmentation chain transfer (RAFT) polymerization. See, for example, U.S. patent application Ser. No. 12/857,430, filed on Aug. 16, 2010 and U.S. patent application Ser. No. 13/069,458, filed on Mar. 23, 2011, each of which is incorporated by reference in its entirety.

In some cases, M belongs to group II and X belongs to group VI, such that the resulting semiconductor nanocrystal includes a II-VI semiconductor material. For example, the M-containing compound can be a cadmium-containing compound and the X donor can be a selenium donor or an sulfur donor, such that the resulting semiconductor nanocrystal includes a cadmium selenide semiconductor material or a cadmium sulfide semiconductor material, respectively.

The particle size distribution can be further refined by size selective precipitation with a poor solvent for the nanocrystals, such as methanol/butanol as described in U.S. Pat. No. 6,322,901. For example, nanocrystals can be dispersed in a solution of 10% butanol in hexane. Methanol can be added dropwise to this stifling solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/ hexane and chloroform/methanol. The size-selected nanocrystal population can have no more than a 15% rms deviation from mean diameter, preferably 10% rms deviation or less, and more preferably 5% rms deviation or less.

More specifically, the coordinating ligand can have the formula:

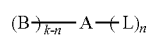

wherein k is 2, 3 or 5, and n is 1, 2, 3, 4 or 5 such that k-n is not less than zero; A is O, S, S=O, $SO_2$, Se, Se=O, N, N=O, P, P=O, As, or As=O; each of B and L, independently, is aryl, heteroaryl, or a straight or branched $C_{2-12}$ hydrocarbon chain optionally containing at least one double bond, at least one triple bond, or at least one double bond and one triple bond. The hydrocarbon chain can be optionally substituted with one or more $C_{1-4}$ alkyl, $C_{2-4}$ alkenyl, $C_{2-4}$ alkynyl, $C_{1-4}$ alkoxy, hydroxyl, halo, amino, nitro, cyano, $C_{3-5}$ cycloalkyl, 3-5 membered heterocycloalkyl, aryl, heteroaryl, $C_{1-4}$ alkylcarbonyloxy, $C_{1-4}$ alkyloxycarbonyl, $C_{1-4}$ alkylcarbonyl, or formyl. The hydrocarbon chain can also be optionally interrupted by —O—, —S—, —N($R^a$)—, —N($R^a$)—C(O)—O—, —O—C(O)—N($R^a$)—, —N($R^a$)— C(O)—N($R^b$)—, —O—C(O)—O—, —P($R^a$)—, or —P(O) ($R^a$)—. Each of $R^a$ and $R^b$, independently, is hydrogen, alkyl, alkenyl, alkynyl, alkoxy, hydroxylalkyl, hydroxyl, or haloalkyl.

A suitable coordinating ligand can be purchased commercially or prepared by ordinary synthetic organic techniques, for example, as described in J. March, *Advanced Organic Chemistry*, which is incorporated by reference in its entirety.

Transmission electron microscopy (TEM) can provide information about the size, shape, and distribution of the nanocrystal population. Powder X-ray diffraction (XRD) patterns can provide the most complete information regarding the type and quality of the crystal structure of the nanocrystals. Estimates of size are also possible since particle diameter is inversely related, via the X-ray coherence length, to the peak width. For example, the diameter of the nanocrystal can be measured directly by transmission electron microscopy or estimated from X-ray diffraction data using, for example, the Scherrer equation. It also can be estimated from the UV/Vis absorption spectrum.

One characteristic of semiconductor nanocrystals is that their optical properties can vary over time. Such variations can be undesirable. One dramatic manifestation of this variation is "blinking" of individual nanocrystals. Single nanocrystal blinking reduces the quantum yield of nanocrystals, and controlling blinking has been the focus of intense research. Two distinct blinking mechanisms may exist. The first proposed mechanism is consistent with the traditional concept of nanocrystal blinking, that is, random electrical charging and discharging of the core of the nanocrystal. In this model, a charged state is "dark" due to highly efficient nonradiative Auger recombination. The second proposed mechanism is that the majority of nanocrystals blink due to the filling and emptying of a surface defect "trap" on the nanocrystal. If not occupied, this trap intercepts an excited state electron that would otherwise produce photon emission, thus causing a blink. See, for example, Galland, C., et al. 2011, Nature, 479(7372); 203, which is incorporated by reference in its entirety.

In some embodiments, a sulfur and cadmium precursor can be used for semiconductor nanocrystal synthesis, e.g., for shell synthesis in the core-shell nanocrystals. Octanethiol can be used as the X precursor and cadmium oleate as M precursor. With slow shell precursor infusion, high-quality CdSe/CdS core-shell semiconductor nanocrystals can be synthesized with narrow size distribution, super narrow PL peak width and high PL quantum yield (QY). The size distribution can have a relative standard deviation of less than 10%, less than 9%, less than 8%, less than 7%, less than 6%, or less than 5%. The PL QY can be over 90%, over 95%, preferably over 96%, and more preferably up to 97%. The CdSe/CdS core/shell nanocrystals can show dramatically reduced single dot blinking property.

EXAMPLES

The CdSe core nanocrystals were synthesized according to previously established methods. See, for example, Carbone, L., et al. *Nano Lett.* 2007, 7, 2942-2950, which is incorporated by reference in its entirety. Briefly, 60 mg CdO, 280 mg octadecylphosphonic acid (ODPA) and 3 g trioctylphosphine oxide (TOPO) were added to a 50 mL flask. The mixture was heated to 150° C. and degassed under vacuum for 1 hour. Under nitrogen flow, the reaction mixture was heated to 320° C. to form a colorless clear solution. After adding 1.8 mL trioctylphosphine (TOP) to the solution, the temperature was brought up to 380° C., at which Se/TOP (60 mg Se in 0.5 mL TOP) solution was swiftly injected into the flask. When the CdSe core nanocrystals reached the desired size, the reaction was terminated by removing the heat. The resulting particles were precipitated by methanol and dispersed in toluene and further purified with two rounds of precipitation/dispersion cycles with method/toluene. The final purified CdSe nanocrystals were dissolved in hexane as a stock solution.

For a typical shell overcoating reaction, a hexane stock solution containing 100 nmol of CdSe core nanocrystals was added in a mixture of 1-octadecene (ODE, 3 mL) and oleylamine (OAm, 3 mL). The reaction solution was degassed under vacuum at room temperature for 1 hour and at 120° C. for 20 min to remove the hexane, water, and oxygen from the reaction solution. Afterwards, the reaction solution was heated up to the growth temperature (310° C.) under nitrogen flow and magnetic stirring. Cd-oleate was used as Cd precursor and the octanethiol was chosen as sulfur precursor. A calculated amount of Cd-oleate (diluted in ODE with a total volume of 6 mL) and octanethiol (diluted in ODE with total volume of 6 mL) precursors was infused into the growth solution with infusion rate of 0.05 mL/min using a syringe pump when the temperature reached 240° C. and the time was counted as zero. After finishing the precursor infusion, oleic acid (2 mL) and oleylamine (2 mL) were injected in the reaction solution to provide extra ligands for the final core/shell nanocrystals. Then, the reaction solution was further annealed at 310° C. for 30 min. The reaction was monitored by UV-Vis absorption, photoluminescence (PL), transmission electron microscopy (TEM).

FIG. 1 shows typical PL and UV-Vis absorption spectra evolution of this core/shell growth reaction. Both the PL peak and lowest energy absorption peaks shifted toward the lower energy side (i.e., red shifted) during the CdS shell growth. The red shift can be attributed to the reduced confinement of excited-state electrons in the nanocrystal. See, for example, Mekis, I., et al. *J. Phys. Chem. B* 2003, 107, 7454-7462, which is incorporated by reference in its entirety. Single narrow PL peak and absorption spectra with well-resolved transitions may indicate that particle size distribution can remain tight throughout the entire CdS shell growth process (FIG. 1*a-b*). PL QY measurements showed that immediately after shell precursor infusion started, the PL QY decreased 91% of the QY of plain CdSe core nanocrystals (FIG. 1*c*) which was due to the thiol-quenching effect from the sulfur precursor. After that, the PL QY gradually increased during the reaction, indicating successful shell formation. PL QY reached its maximum when the reaction solution was annealed at 310° C. for 30 min after finishing the shell precursor injection (FIG. 1*c*). Prolonged annealing time did not lead to any increase in either the PL QY or the size of the final core/shell nanoparticles. The highest PL QY of the obtained CdSe/CdS nanocrystals was 97%. The full width half maximum (FWHM) of PL peak decreased monotonically from 96.2 meV (26.4 nm in wavelength) for the uncoated CdSe cores, to 67.1 meV (20.3 nm in wavelength) for the final CdSe/CdS core/shell nanocrystals (FIG. 1*d*). This stood in contrast to typical core/shell growth reactions which normally broaden the PL peak. This PL peak narrowing effect may be explained by the slow, controllable shell growth rate, which resulted from the combination of slow precursor infusion rate, and the strong carbon-sulfur bond. Indeed, with a faster infusion rate (e.g., 1 mL/min) and keeping other reaction conditions unchanged, the FWHM of PL peak of final CdSe/CdS core/shell nanocrystals broadened to 108 meV (34.2 nm in wavelength). By only replacing the octanethiol with equivalent amount of elemental sulfur, the FWHM of PL peak of final CdSe/CdS core/shell slightly broadened to 98.2 meV (30.8 nm in wavelength).

Figure 3:
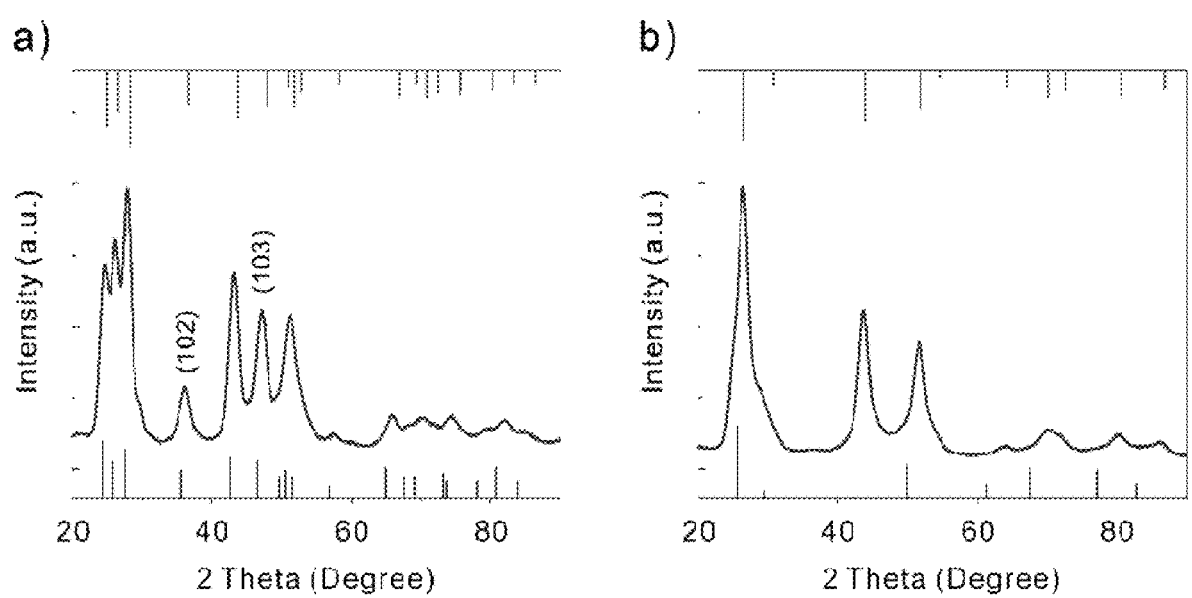
FIG. 3 shows the XRD spectrum of (a) wurtzite CdSe/CdS core/shell nanocrystals and (b) zinc-blende CdSe/CdS core/shell nanocrystals. The stick patterns show the positions of standard XRD peaks for bulk CdSe (bottom) and CdS (upper).

FIG. 2*a-d* show TEM images of the CdSe starting core nanocrystals and CdSe/CdS core/shell nanocrystals with different shell thickness. With the CdS shell growth, the nanocrystal size increased from 4.4 nm of uncoated CdSe to 9.1 nm of final CdSe/CdS core/shell nanocrystals corresponding to 7.0 monolayer (ML) of CdS shell. Half of the wurtzite c-axis unit cell dimension (3.37 Å) was used as the thickness of 1 ML of CdS shell. See, for example, Chen, Y., et al. *J. Am. Chem. Soc.* 2008, 130, 5026-5027, which is incorporated by reference in its entirety. TEM measurements showed that the size distribution of the CdSe/CdS core/shell nanocrystals remained narrow (~4-5%) throughout the entire shell growth process which was consistent with UV-Vis and PL measurements. A typical High-Resolution (HR) TEM image of CdSe/CdS core/shell nanocrystals is shown in FIG. 2*e*, which reveals a high crystallinity with cross lattice fringes throughout the whole particle. The lattice distance of this particular particle was 3.61 Å, corresponding to the (100) lattice spacing of wurtzite (W) crystal structure. Due to the high uniformity, these core/shell nanocrystals were easily self-assembled to form a large area superlattice. FIG. 2*f* shows the fcc superlattice viewed along the [111] zone axis formed by the CdSe/CdS core/shell nanocrystals shown in FIG. 2D. The XRD measurement results provided unambiguous evidence that the final core/shell particles have a W crystal structure with the characteristic (102) and (103) Bragg peaks (FIG. 3*a*). This result was consistent with the W crystal structure of starting CdSe cores, demonstrating epitaxial CdS shell formation. See, for example, Carbone, L., et al. *Nano Lett.* 2007, 7, 2942-2950, which is incorporated by reference in its entirety. To further prove this epitaxial shell growth, W—CdSe cores were replaced with zinc-blende (ZB) ones. As expected, the resulting CdSe/CdS core/shell nanocrystals possessed a ZB crystal structure (FIG. 3B).

Figure 4:
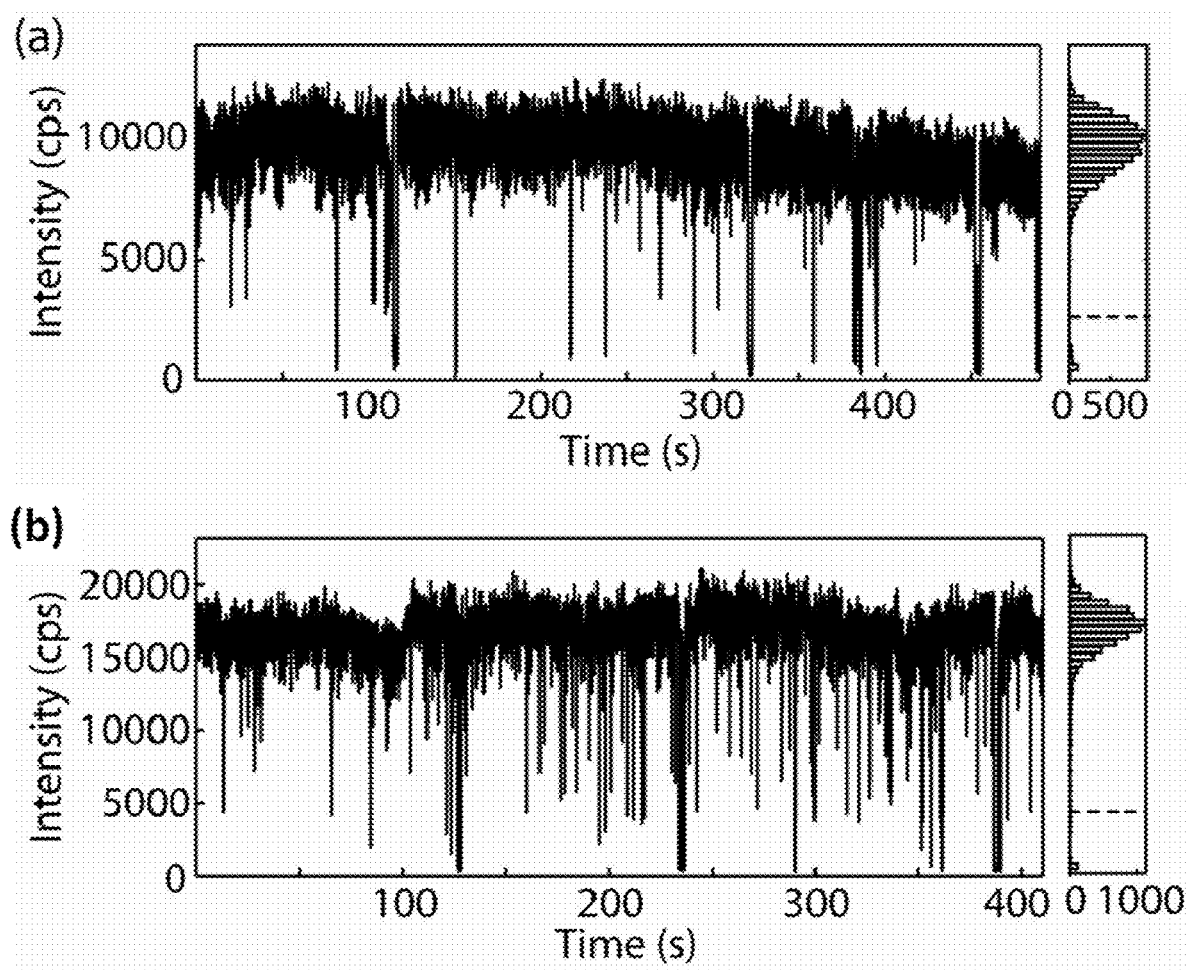
FIG. 4 shows a representative PL blinking trace of a single dot for (a) NC593 and (b) NC624 and a histogram indicating the distribution of intensities observed in the trace.

FIG. 4 shows representative blinking traces data for two batches of the CdSe/CdS core/shell nanocrystals with emission peak centered at 593 nm (NC593) and 624 nm (NC624). The dashed line indicates the value chosen as the threshold between "on" and "off" states in calculating the "on" time fraction. The average "on" fraction was 89%±7% for NC593 and 93%±6% for NC624. The histogram of the PL intensity distribution in FIG. 4a and FIG. 4c revealed well-resolved two-state blinking of the CdSe/CdS nanocrystals. The dashed line in the histogram indicates the threshold chosen to determine "on" and "off" states. From the blinking traces, the time fraction of the nanocrystal was calculated to stay in the "on" state during the course of measurement (5-20 mins). The average "on" fraction is 89%±7% for NC593 and 93%±6% for NC624. CdSe/CdS core/shell nanocrystals with such high on-time fractions have never been achieved for core/shell nanocrystals with relatively thin shell thickness (less than 10 ML).

After semiconductor nanocrystal cores were synthesized previously described methods, Cd-oleate and octanethiol were used as cadmium and sulfur precursors, respectively, with a slow infusion rate to overcoat the nanocrystal cores and synthesize high-quality CdSe/CdS core-shell nanocrystals. CdSe/CdS core/shell nanocrystals prepared this way possessed well defined spherical shape, narrow size distribution, high PL QY (as high as 97%), very narrow PL peak (FWHM as narrow as 67.1 meV for ensemble sample), and significantly reduced single dot blinking on-time fraction (as high as 93%). In addition, both Cd-oleate and octanethiol precursors were less sensitive to air and moisture than most existing precursors, making it easier to handle the reagents and reducing costs for large scale synthesis.

Other embodiments are within the scope of the following claims.

What is claimed is:

1. A method of making a nanocrystal comprising:
heating a mixture including a nanocrystal core to between 200° C. and 350° C.; and
while maintaining a constant temperature between 200° C. and 350° C., infusing a calculated amount of a non-organometallic M-containing compound and a X donor together into the mixture including the nanocrystal core, wherein the X donor is an alkyl thiol, at a rate of between 0.03 ml/minute and 0.07 ml/minute, thereby forming an overcoating including M and X on the core.

2. The method of claim 1, wherein the M-containing compound is a metal salt.

3. The method of claim 2, wherein the metal salt is a cadmium salt.

4. The method of claim 1, wherein the X donor is a $C_6$ to $C_{18}$ alkyl thiol.

5. The method of claim 1, wherein the infusion occurs over a period of 1 minute or longer.

6. The method of claim 5, wherein the infusion occurs over a period of 10 minutes or longer.

7. The method of claim 6, wherein the infusion occurs over a period of 30 minutes or longer.

8. The method of claim 1, wherein infusing occurs continuously.

9. The method of claim 1, wherein contacting the M-containing compound and the X donor with the nanocrystal core at a slow rate of infusion with a syringe pump.

10. The method of claim 1, wherein the overcoated nanocrystal photoluminesces with a quantum yield of at least 90% at room temperature.

11. The method of claim 10, wherein the overcoated nanocrystal photoluminesces with a quantum yield of at least 97% at room temperature.

12. The method of claim 1, further comprising exposing the overcoated nanocrystal to an organic compound having affinity for a surface of the overcoated nanocrystal.

13. The method of claim 1, wherein the nanocrystal core includes CdSe.

14. The method of claim 1, wherein the overcoating includes CdS.

15. The method of claim 1, wherein the nanocrystal core is a member of a substantially monodisperse population of nanocrystal cores.

16. The method of claim 1, wherein the overcoated nanocrystal is a member of a substantially monodisperse population of overcoated nanocrystals.

17. The method of claim 16, wherein the population emits light in a spectral range of no greater than about 34 nm full width at half max (FWHM).

18. The method of claim 17, wherein the population exhibits less than a 10% rms deviation in diameter of the overcoated nanocrystal.

19. The method of claim 18, wherein the population exhibits less than a 5% rms deviation in diameter of the overcoated nanocrystal.

* * * * *